United States Patent
Taylor et al.

(10) Patent No.: US 9,242,299 B2
(45) Date of Patent: Jan. 26, 2016

(54) MACHINING TOOL AND METHOD OF MANUFACTURING SAME

(75) Inventors: Alan Taylor, Lake Orion, MI (US); Virgiliu-Adrian Savu, Allen Park, MI (US); Steven Aharrah, II, Smethport, PA (US)

(73) Assignee: GKN Sinter Metals, LLC, Auburn Hills, MI (US)

( * ) Notice: Subject to any disclaimer, the term of this patent is extended or adjusted under 35 U.S.C. 154(b) by 664 days.

(21) Appl. No.: 13/515,157

(22) PCT Filed: Jan. 6, 2011

(86) PCT No.: PCT/US2011/020342
§ 371 (c)(1), (2), (4) Date: Jun. 11, 2012

(87) PCT Pub. No.: WO2011/085078
PCT Pub. Date: Jul. 14, 2011

(65) Prior Publication Data
US 2012/0282046 A1    Nov. 8, 2012

Related U.S. Application Data

(60) Provisional application No. 61/292,933, filed on Jan. 7, 2010.

(51) Int. Cl.
*B23B 27/22* (2006.01)
*B23B 27/12* (2006.01)
(Continued)

(52) U.S. Cl.
CPC ............. *B23B 27/145* (2013.01); *B23P 15/34* (2013.01); *B23B 2226/125* (2013.01); *Y10T 29/49925* (2015.01); *Y10T 407/22* (2015.01); *Y10T 407/2202* (2015.01)

(58) Field of Classification Search
CPC . B23B 2226/125; B23B 27/145; B23P 15/34; Y10T 29/49925
USPC .......................................... 407/113–115, 119
See application file for complete search history.

(56) References Cited

U.S. PATENT DOCUMENTS 3,369,283 A * 2/1968 Colding ......................... 407/119
3,629,919 A * 12/1971 Trevarrow, Jr. ............... 407/103
(Continued)

FOREIGN PATENT DOCUMENTS

CN    1787892 A    6/2006
EP    2495058 A1 *  9/2012
(Continued)

OTHER PUBLICATIONS

The State Intellectual Property Office of the People's Republic of China, First Office Action, Application No. 201180005176.0, Jan. 23, 2014, 15 pages.
(Continued)

*Primary Examiner* — Sunil K Singh
*Assistant Examiner* — Sara Addisu
(74) *Attorney, Agent, or Firm* — Quarles & Brady LLP

(57) ABSTRACT

A machining tool insert holder having a first surface, a second surface opposite the first surface, and a first insert tip slot extending between the first surface and the second surface. The first insert tip slot is configured to support a first insert tip. The insert holder further includes elevated projections extending from the first and second surfaces proximate the first insert tip slot.

8 Claims, 5 Drawing Sheets

(51) Int. Cl.
*B23B 27/14* (2006.01)
*B23P 15/34* (2006.01)

(56) References Cited

U.S. PATENT DOCUMENTS

| | | | |
|---|---|---|---|
| 3,800,380 A * | 4/1974 | Cline et al. | 407/118 |
| RE30,503 E | 2/1981 | Lee et al. | |
| 4,437,800 A * | 3/1984 | Araki et al. | 407/119 |
| 4,457,765 A * | 7/1984 | Wilson | 51/293 |
| 4,558,974 A * | 12/1985 | Pano | 407/50 |
| 4,561,810 A * | 12/1985 | Ohno | 407/118 |
| 4,690,691 A * | 9/1987 | Komanduri | 51/293 |
| 4,714,384 A * | 12/1987 | Lagerberg | 407/103 |
| 4,854,784 A * | 8/1989 | Murray et al. | 407/114 |
| 5,139,372 A * | 8/1992 | Tanabe et al. | 407/118 |
| 5,183,362 A * | 2/1993 | Kuroyama et al. | 407/118 |
| 5,594,931 A | 1/1997 | Krall et al. | |
| 5,676,496 A * | 10/1997 | Littecke et al. | 407/118 |
| 5,712,030 A * | 1/1998 | Goto et al. | 428/332 |
| 5,738,468 A * | 4/1998 | Boianjiu | 407/103 |
| 5,836,723 A * | 11/1998 | Von Haas et al. | 407/107 |
| 5,846,032 A * | 12/1998 | Murakami | 407/102 |
| 6,099,209 A * | 8/2000 | Murray et al. | 407/1 |
| 6,155,755 A * | 12/2000 | Kanada et al. | 407/118 |
| 6,540,450 B2 * | 4/2003 | Gatton et al. | 407/113 |
| 6,579,045 B1 * | 6/2003 | Fries et al. | 407/118 |
| 6,929,428 B1 * | 8/2005 | Wermeister et al. | 407/113 |
| 7,234,782 B2 | 6/2007 | Stehney | |
| 7,270,379 B2 | 9/2007 | Stehney | |
| 7,322,776 B2 | 1/2008 | Webb et al. | |
| 7,360,972 B2 | 4/2008 | Sjogren | |
| 7,396,501 B2 | 7/2008 | Pope et al. | |
| 7,524,345 B2 | 4/2009 | Nevoret et al. | |
| 7,578,640 B2 | 8/2009 | Hecht | |
| 7,824,134 B2 * | 11/2010 | Webb et al. | 407/113 |
| 7,837,416 B2 * | 11/2010 | Omori et al. | 407/113 |
| 7,976,251 B2 * | 7/2011 | Iyori et al. | 407/114 |
| 8,657,539 B2 * | 2/2014 | Morrison et al. | 407/113 |
| 8,657,540 B2 * | 2/2014 | Yamazaki et al. | 407/114 |
| 8,784,014 B2 * | 7/2014 | Onodera | 407/114 |
| 2002/0131832 A1 * | 9/2002 | Morsch | 407/118 |
| 2002/0146292 A1 * | 10/2002 | Shimizu | 407/113 |
| 2004/0228694 A1 * | 11/2004 | Webb et al. | 407/113 |
| 2004/0234349 A1 * | 11/2004 | Ueda et al. | 407/113 |
| 2004/0265075 A1 * | 12/2004 | Kolker | 407/113 |
| 2005/0019111 A1 | 1/2005 | Kitagawa et al. | |
| 2005/0019113 A1 * | 1/2005 | Wermeister | 407/113 |
| 2005/0047885 A1 * | 3/2005 | Hyatt et al. | 409/132 |
| 2005/0152804 A1 * | 7/2005 | Sjogren | 419/1 |
| 2005/0183893 A1 * | 8/2005 | Sjogren et al. | 175/426 |
| 2005/0271483 A1 * | 12/2005 | Sjogren | 407/119 |
| 2006/0269367 A1 * | 11/2006 | Havrda | 407/117 |
| 2007/0189862 A1 * | 8/2007 | Viol | 407/113 |
| 2007/0207715 A1 * | 9/2007 | Webb | 451/540 |
| 2008/0138162 A1 | 6/2008 | Webb et al. | |
| 2011/0299948 A1 * | 12/2011 | Edler et al. | 407/114 |
| 2012/0230785 A1 * | 9/2012 | Chen et al. | 407/114 |
| 2013/0156516 A1 * | 6/2013 | Hecht | 407/103 |
| 2013/0251463 A1 * | 9/2013 | Harif | 407/11 |
| 2013/0343826 A1 * | 12/2013 | Webb | 407/118 |
| 2014/0348599 A1 * | 11/2014 | Kovac et al. | 407/42 |
| 2015/0016902 A1 * | 1/2015 | Okamura et al. | 407/116 |

FOREIGN PATENT DOCUMENTS

| | | |
|---|---|---|
| GB | 2070472 A | 9/1981 |
| JP | 54106986 A * | 8/1979 |
| JP | 2008-030196 | 2/2008 |
| WO | 2004/103617 A1 | 12/2004 |
| WO | WO 2007103939 A2 * | 9/2007 |

OTHER PUBLICATIONS

International Search Report and Written Opinion under date of mailing of Mar. 1, 2011 in connection with PCT/US2011/020342.
Japanese Patent Office, Notification of Reason for Refusal, Application No. 2012-548113, Dec. 2, 2014, 9 pages(including translation).

* cited by examiner

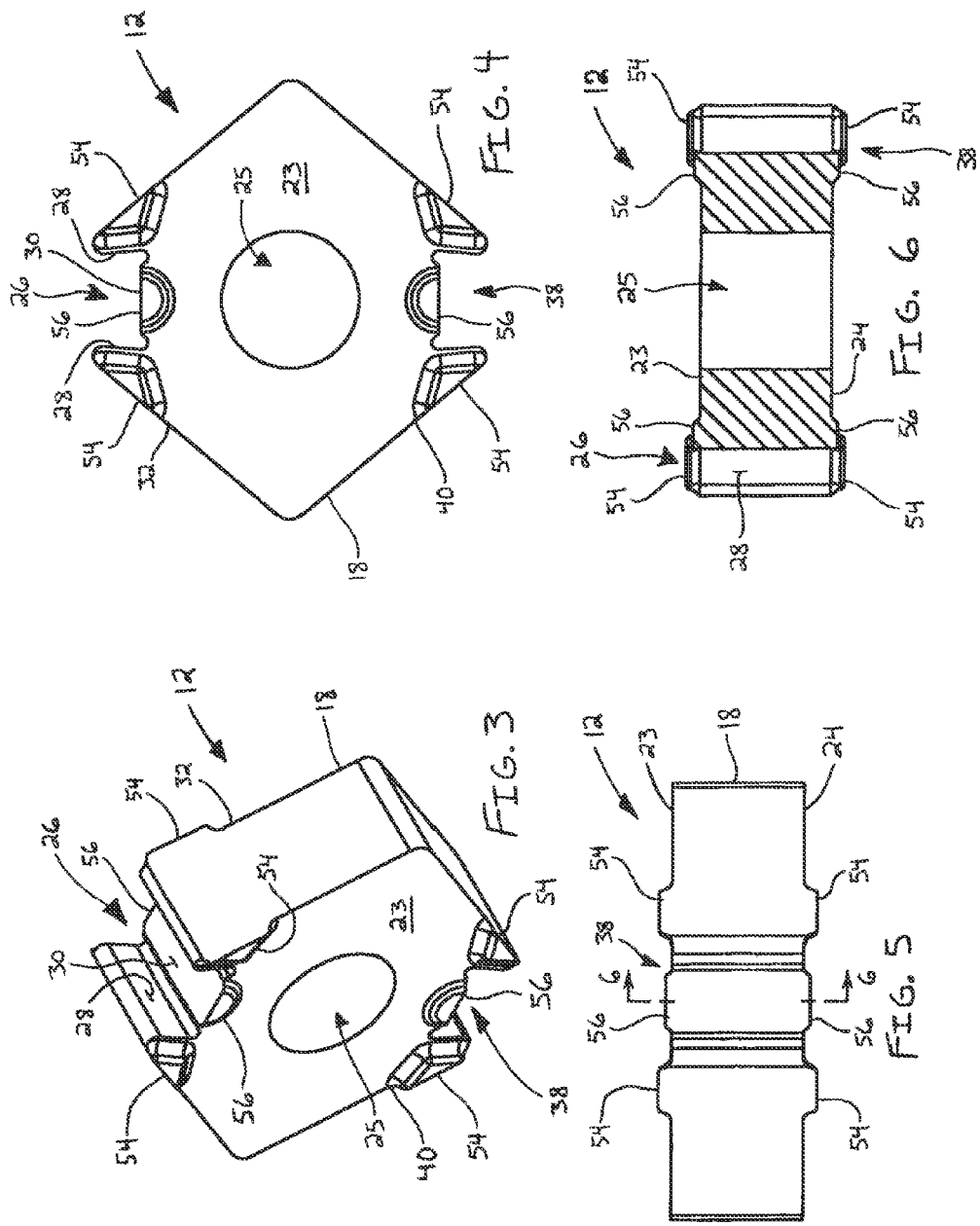

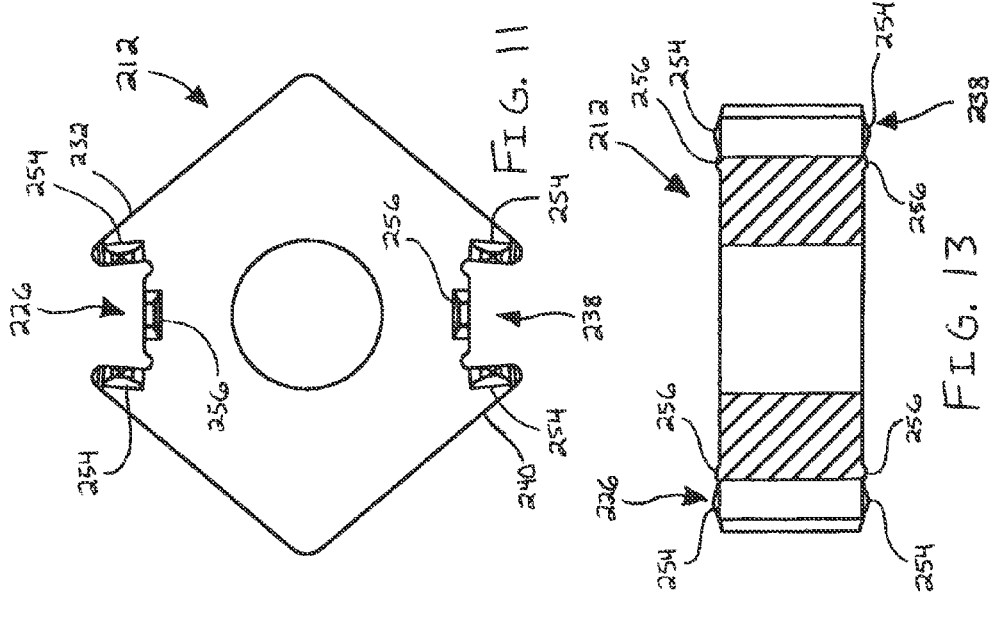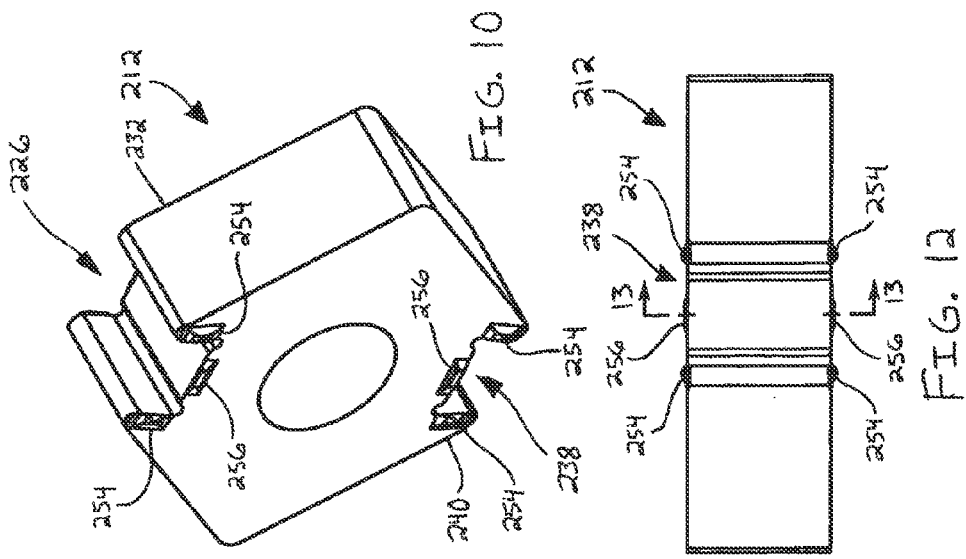

US 9,242,299 B2

MACHINING TOOL AND METHOD OF MANUFACTURING SAME

CROSS-REFERENCE TO RELATED APPLICATIONS

This application represents the national stage entry of PCT International Application No. PCT/US2011/020342 filed Jan. 6, 2011, which claims the benefit of U.S. Provisional Patent Application Ser. No. 61/292,933, filed on Jan. 7, 2010, the disclosures of which is are hereby incorporated by reference for all purposes.

STATEMENT OF FEDERALLY SPONSORED RESEARCH OR DEVELOPMENT

Not applicable.

BACKGROUND OF THE INVENTION

This invention relates to cutting tools, particularly a cutting tool in which a cutting insert tip is supported by an insert holder.

Machining tools, such as milling, drilling, and cutting tools, typically include a cutting insert tip comprising materials such as ceramics, nitrides, carbides, aluminum oxides, iron oxides, natural or synthetic diamond, or the like. To reduce the overall cost of the tool, the insert tip is supported by an insert holder comprising a less expensive material, such as tool steel or the like.

Previous machining tools have used several methods to provide sufficient holding forces between insert holders and insert tips to resist cutting forces experienced during machining processes. For example, in some cases insert tips are connected to insert holders via brazing. Unfortunately, brazing dissimilar materials can be relatively difficult and therefore expensive.

As another example, in some cases insert tips are connected to insert holders via press fitting. Unfortunately, press fitting requires insert tips and insert holders having relatively small tolerances (e.g., on the order of a few ten-thousandths of an inch) in order to ensure appropriate engagement between the components. Of course, insert tips and insert holders having such tolerances are relatively expensive.

Considering the drawbacks of previous designs, relatively inexpensive machining tools and methods for manufacturing such machining tools are needed.

SUMMARY OF THE INVENTION

In one aspect, the present invention provides a machining tool insert holder that comprises a first surface, a second surface opposite the first surface, and a first insert tip slot extending between the first surface and the second surface. The first insert tip slot is configured to support a first insert tip. The insert holder further comprises a first elevated projection extending from the first surface proximate the first insert tip slot.

In another aspect, the present invention provides a machining tool comprising an insert holder having a insert holder hardness. The insert holder includes a first portion having a first density and a second portion integrally connected to the first portion. The second portion defines a first insert tip slot and has a second density. The second density is greater than the first density. The machining tool further comprises a first insert tip supported in the first insert tip slot by the second portion. The first insert tip has a first insert tip hardness, and the first insert tip hardness is greater than the insert holder hardness.

In yet another aspect, the present invention provides a method of manufacturing a machining tool, comprising the steps of 1) providing an insert holder having a first insert tip slot; 2) positioning a first cutting insert tip within the first insert tip slot; and 3) compressing the insert holder to thereby secure the first cutting insert tip within the first insert tip slot.

These aspects and advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

BRIEF DESCRIPTION OF THE DRAWINGS

The invention will hereafter be described with reference to the accompanying drawings, wherein like reference numerals denote like elements, and:

FIG. 3 is a perspective view of the insert holder of the machining tool of FIG. 1 before securing the cutting insert tips to the insert holder;

FIG. 4 is a top view of the insert holder of FIG. 3;

FIG. 5 is a front view of the insert holder of FIG. 3;

FIG. 6 is a sectional view of the insert holder along line 6-6 of FIG. 5;

FIG. 10 is a perspective view of the insert holder of the second embodiment of the machining tool of FIG. 8 before securing the cutting insert tips to the insert holder;

FIG. 11 is a top view of the insert holder of FIG. 10;

FIG. 12 is a front view of the insert holder of FIG. 10; and

FIG. 13 is a sectional view of the insert holder along line 13-13 of FIG. 12.

DETAILED DESCRIPTION OF THE DRAWINGS

Figure 1:
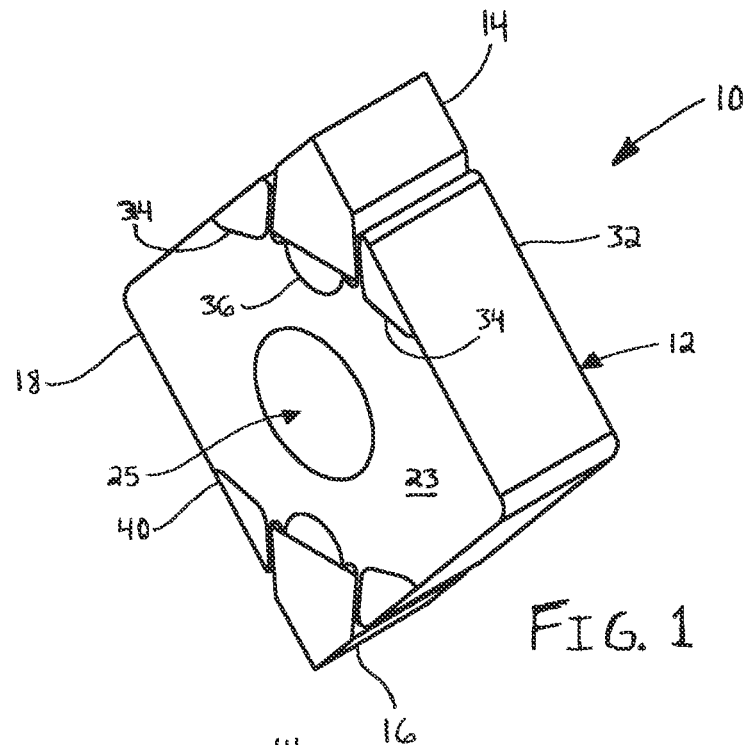
FIG. 1 is a perspective view of a machining tool according to the present invention after securing cutting insert tips to an insert holder of the tool.

The particulars shown herein are by way of example and only for purposes of illustrative discussion of the embodiments of the invention. The particulars shown herein are presented to provide what is believed to be the most useful and readily understood description of the principles and conceptual aspects of the invention. In this regard, no attempt is made to show structural details of the invention in more detail than is necessary for the fundamental understanding of the invention. The description taken with the drawings should make apparent to those skilled in the art how the several forms of the present invention may be embodied in practice.

Referring now to the drawings and particularly FIGS. 1-6, a machining tool 10 according to the present invention includes an insert holder 12 that supports first and second cutting insert tips 14 and 16 on opposite sides. The insert tips 14 and 16 are secured by deforming several elevated projections 54 and 56 (FIG. 3) on the insert holder 12 during manufacturing. These aspects of the machining tool 10 are described in further detail in the following paragraphs, beginning with the insert tips 14 and 16 and concluding with methods for manufacturing the machining tool 10.

The insert tips 14 and 16 engage and cut work pieces in machining processes. As such, the insert tips 14 and 16 comprise a hard material, preferably cubic boron nitride, although other materials such as ceramics, nitrides, carbides, aluminum oxides, iron oxides, natural or synthetic diamond, or the like, may be used without departing from the scope of the invention. Furthermore, the insert tips 14 and 16 are also preferably seven-sided and have three-dimensional general spade shapes to facilitate cutting in machining processes.

The insert holder 12 comprises a material that is less hard than the insert tips 14 and 16. Specifically, the insert holder 12 preferably comprises a sintered powder metal, such as FN-0205 nickel steel, as described in further detail below. Other materials, such as iron-nickel steel powder metals, stainless steel powder metals, or the like, may also be used.

Still referring to FIGS. 1-6, the insert holder 12 includes a main body or first portion 18 having a density that is preferably at most substantially 85 percent of the full or theoretical density of the holder material, and more preferably substantially 85 percent of the full density of the holder material (substantially meaning +/−2.5 percent). Of course, the term "full density" should be understood to mean the density of the material when it does not include any internal pores. In the present case, such internal pores are due to forming the insert holder 12 from powder metal.

The main body 18 of the insert holder 12 preferably has a modified rhombus shape and is symmetric over two perpendicular planes 20 and 22 (FIG. 2) that intersect in the center of the insert holder 12. The insert holder 12 also includes a first or upper surface 23, a second or lower surface 24 (FIGS. 5 and 6), and a center hole 25 extending between the upper and lower surfaces 23 and 24. A fastener (not shown) may extend through the center hole 25 to secure the machining tool 10 to a support (not shown).

Figure 2:
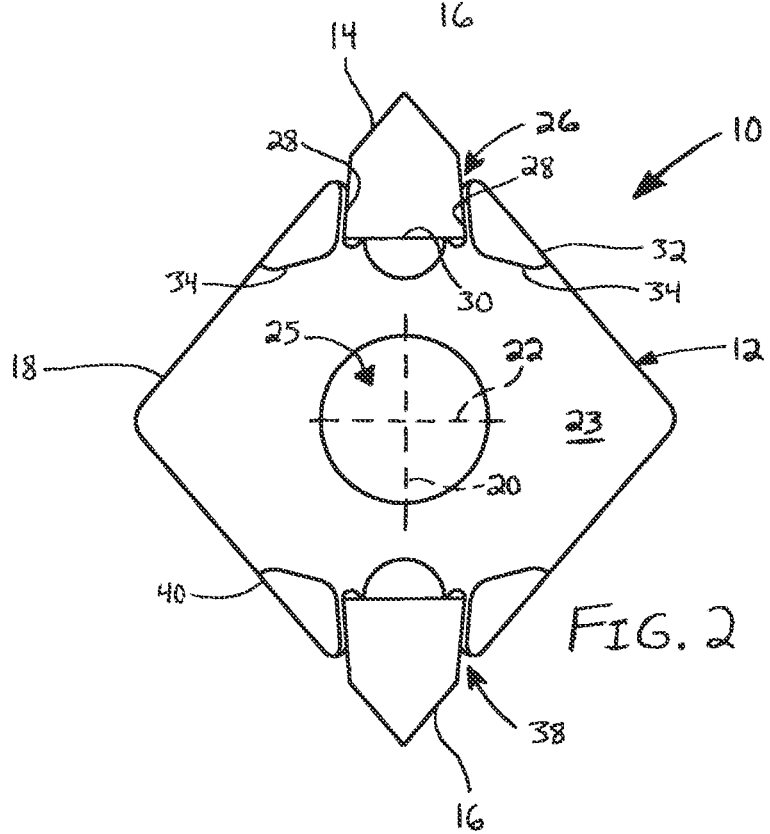
FIG. 2 is a top view of the machining tool of FIG. 1.
Figure 7:
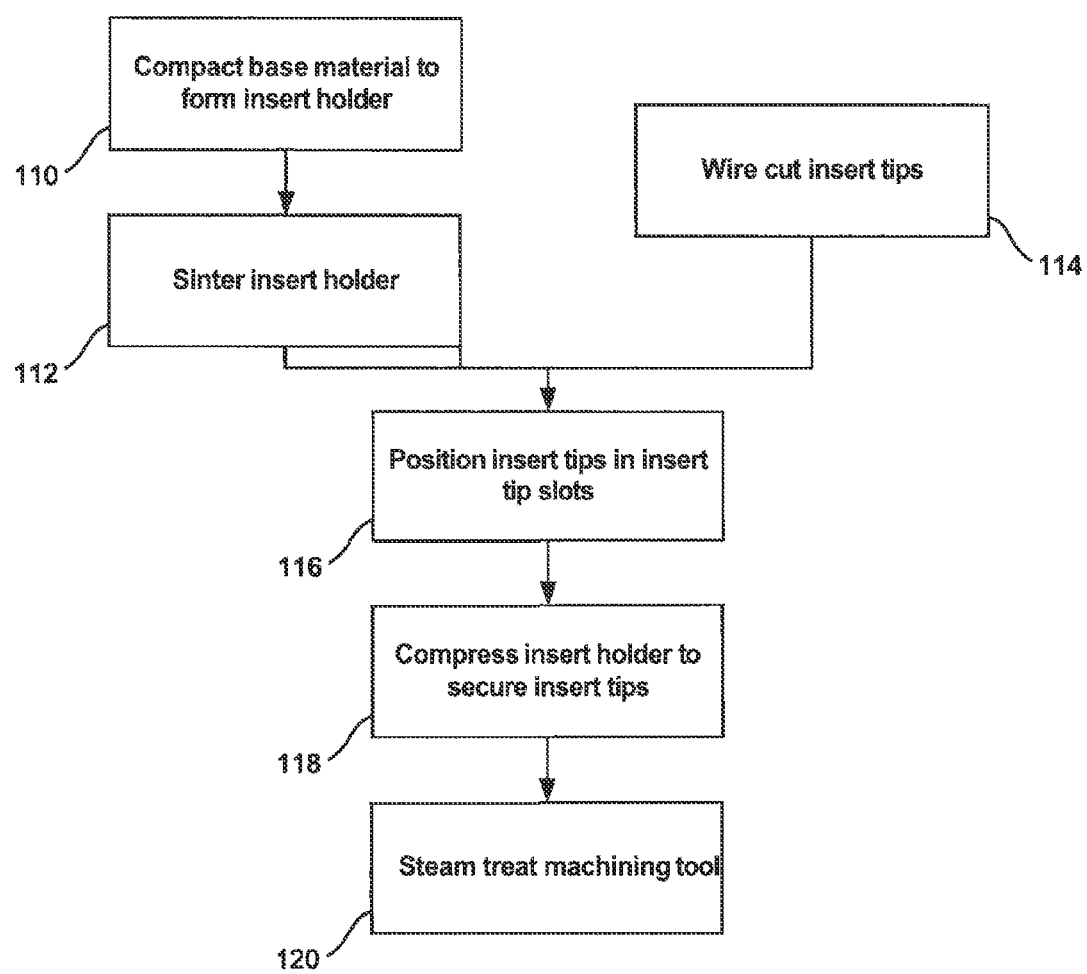
FIG. 7 is a flow chart of a method of manufacturing the machining tool of FIG. 1.

Referring particularly to FIGS. 2-4, the insert holder 12 also includes a first insert tip slot 26 extending between the upper and lower surfaces 23 and 24 in which the first insert tip 14 is supported. The first insert tip slot 26 is defined by three sides, i.e., two side surfaces 28 and one backing surface 30. The side surfaces 28 may be angled toward one another extending away from the center of the insert holder 12 to prevent the insert tip 14 from detaching from the insert holder 12 by moving in a direction perpendicular to the plane 22.

Referring now to FIGS. 1 and 2, the sides 28 and 30 of the first insert tip slot 26 are defined by a second portion 32 of the insert holder 12 integrally connected to the main body 18. As used herein, the term "integral" and variations thereof describe portions of components that are formed with adjacent portions from a single piece of material. The second portion 32 includes increased-density features near both the upper and lower surfaces 23 and 24 of the insert holder 12. That is, the second portion 32 includes side increased-density features 34 proximate each of the side surfaces 28 and backing increased-density features 36 proximate the backing surface 30.

Each of the increased-density features 34 and 36 has a density that is preferably at least substantially 95 percent of the holder material's full density, and more preferably substantially 100 percent of the holder material's full density. Such densities are provided by a swaging process as described in further detail below. This process also causes deformation of the sides 28 and 30 of the first insert tip slot 26 (e.g., the cross-sectional area of the slot is 26 is slightly reduced) to secure the first insert tip 14 within the first insert tip slot 26. Furthermore, the increased-density features 34 and 36 are located primarily near the upper and lower surfaces and side surfaces of the insert holder 12. That is, the increased-density features 34 and 36 do not have a uniform cross-sectional area that extends from the upper surface to the lower surface of the insert holder 12. Similarly, in some embodiments the insert holder 12 includes a density gradient between each of the increased-density features 34 and 36 and the lower-density main body 18 of the holder 12.

The insert holder 12 further includes a second insert tip slot 38 in which the second insert tip 16 is supported. The second insert tip slot 38 is defined by a third portion 40 of the insert holder 12 integrally connected to the main body 18. The third portion 40 is generally identical to the second portion 32 of the insert holder 12, and therefore is not described in detail.

Referring now to FIGS. 3-7, the machining tool 10 is preferably manufactured as follows. First, at step 110 a base material (e.g., FN-0205 nickel steel powder metal) is compacted in a press to form an insert holder 12 having the shape shown in FIGS. 3-6. The insert holder 12 originally includes elevated projections instead of increased-density features. That is, the insert holder 12 includes generally triangular side elevated projections 54 and generally semi-circular backing elevated projections 56. The side elevated projections 54 and the backing elevated projections 56 preferably have heights of approximately 0.50 mm and 0.25 mm, respectively, to ensure adequate material flow while preventing excessive compression forces in subsequent steps. The insert holder 12 is then sintered, e.g., at 1120 degrees C. for 30 minutes at step 112.

Next or simultaneously with the previous steps, a second base material (e.g., cubic boron nitride) is wire cut to form the insert tips 14 and 16 at step 114. Both the insert tips 14 and 16 and the insert tip slots 26 and 38 of the insert holder 12 may be manufactured with relatively large tolerances (e.g., on the order of several thousandths of an inch) because press fitting is not used to secure the insert tips 14 and 16 to the insert holder 12.

The first and second insert tips 14 and 16 are then positioned in the first and second insert tip slots 26 and 38, respectively, at step 116. The insert holder 12 is then compressed or swaged axially (i.e., in a direction perpendicular to the upper and lower surfaces 23 and 24) by a press at step 118. Such a compression process deforms the elevated projections 54 and 56 to provide the increased-density features 34 and 36, respectively. This deformation secures the insert tips 14 and 16 within the insert tip slots 26 and 38, respectively. The machining tool 10 may be compressed within a fixture that surrounds the sides of the tool 10; such a fixture insures that the side elevated projections 54 do not deform away from the insert tips 14 and 16. Finally, the machining tool 10 may be steam treated at step 120 to increase bonding between the insert tips 14 and 16 and the insert holder 12 and to increase corrosion resistance of the machining tool 10.

Figure 8:
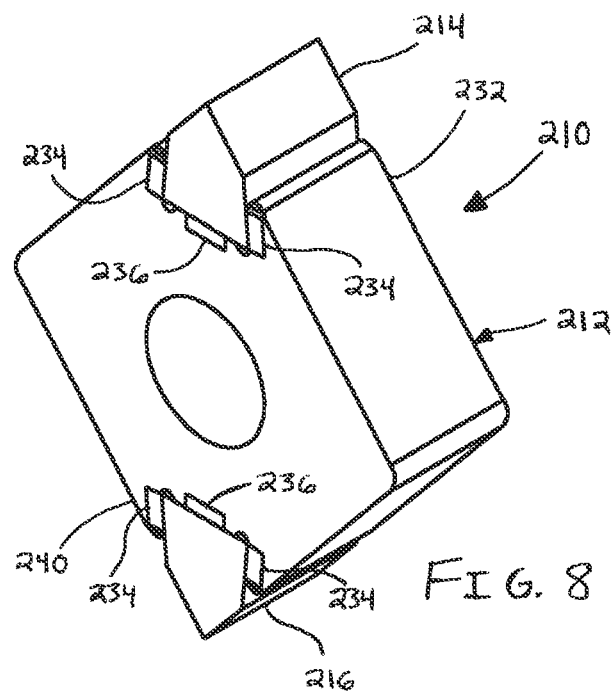
FIG. 8 is a perspective view of a second embodiment of a machining tool according to the present invention after securing cutting insert tips to an insert holder of the tool.
Figure 9:
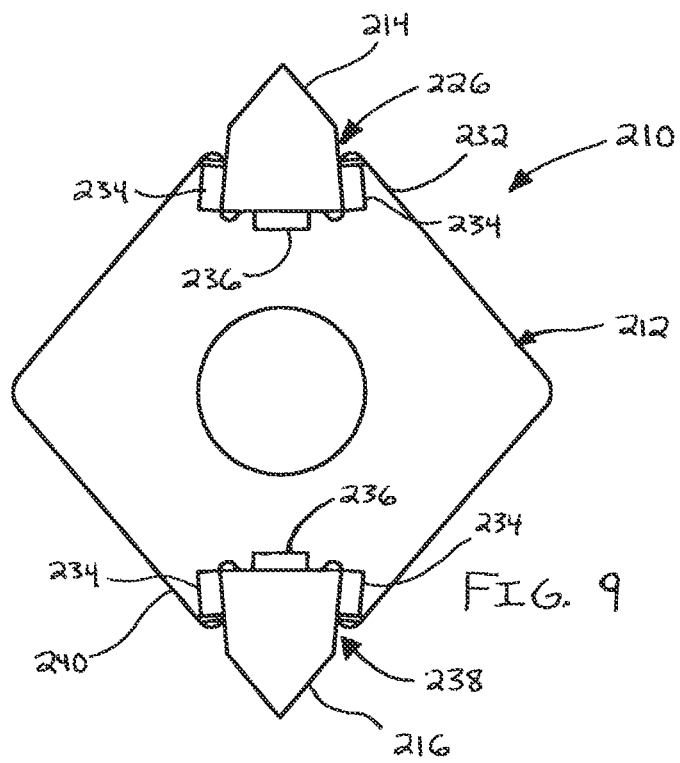
FIG. 9 is a top view of the second embodiment of the machining tool of FIG. 8.

Of course, the machining tool may be manufactured differently or have differently shaped features from the above description without departing from the scope of the invention. For example and referring now to FIGS. 8-13, a second embodiment of a machining tool 210 according to the present invention includes an insert holder 212 that supports first and second insert tips 214 and 216 within first and second insert tip slots 226 and 238, respectively. The machining tool 210 is generally as described above, although the second and third portions 232 and 240 include modified elevated projections, Specifically, the side elevated projections 254 and the backing elevated projections 256 (FIGS. 10-13) have general pyramid shapes and heights of approximately 0.40 mm and 0.10 mm, respectively. Such elevated projections 254 and 256 provide smaller increased-density features 234 and 236 (FIGS. 8 and 9) and reduce the loading between the insert holder 212 and the insert tips 214 and 216. Such reduced loading may be useful depending on the specific materials used for each of the components.

As another example, the insert tips 14 and 16 may be slightly shorter than the insert holder 12. In such embodiments, the elevated projections 54 and 56 may be deformed to provide small lips (not shown) at the edges between the upper and lower surfaces 23 and 24 and the insert slots 26 and 38 to further secure the insert tips 14 and 16.

From the above description it should be apparent that the present invention provides relatively inexpensive machining tools and methods for their manufacture. These advantageous tools and methods are facilitated, in part, due to the relatively large tolerances of the insert holder and the insert tips and using the relatively simple process of compressing the elevated projections to secure the insert tips in the insert holder.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A machining tool insert holder, comprising:
a first surface;
a second surface opposite the first surface;
a first insert tip slot extending between the first surface and the second surface, the first insert tip slot being configured to support a first cutting insert tip; and
a first elevated projection extending from the first surface proximate the first insert tip slot;
wherein the first elevated projection is less than full density of the tool holder material and is deformed to increase its density to secure a cutting tip in the first insert tip slot.

2. The insert holder of claim 1, wherein the first insert tip slot is defined by two side surfaces disposed on opposite sides of a backing surface, the first elevated projection being disposed proximate a first of the side surfaces, and further comprising:
a second elevated projection extending from the first surface proximate the backing surface; and
a third elevated projection extending from the first surface proximate a second of the side surfaces.

3. The insert holder of claim 2, wherein the side surfaces are angled toward one another extending away from a center of the insert holder.

4. The insert holder of claim 1, wherein the first elevated projection is one of a first plurality of elevated projections extending from the first surface proximate the first insert tip slot, and further comprising a second plurality of elevated projections extending from the second surface proximate the first insert tip slot.

5. The insert holder of claim 4, further comprising:
a second insert tip slot extending between the first surface and the second surface, the second insert tip slot being configured to support a second cutting insert tip;
a third plurality of elevated projections extending from the first surface proximate the second insert tip slot; and
a fourth plurality of elevated projections extending from the second surface proximate the second insert tip slot.

6. The insert holder of claim 4, wherein each of the first plurality of elevated projections has a height from the first surface in a range of 0.10 mm to 0.50 mm, and each of the second plurality of elevated projections has a height from the second surface in a range of 0.10 mm to 0.50 mm.

7. The insert holder of claim 1, wherein the insert holder comprises a sintered powder metal.

8. A machining tool, comprising:
an insert holder having an insert holder hardness, and the insert holder including:
a first portion having a first density;
a second portion integrally connected to the first portion, the second portion defining a first insert tip slot, and the second portion having a second density, the second density being greater than the first density; and
a first cutting insert tip supported in the first insert tip slot by the second portion, and the first cutting insert tip having a first cutting insert tip hardness, the first cutting insert tip hardness being greater than the insert holder hardness;
wherein the first insert tip slot is defined by three sides, and the second portion includes:
a first feature proximate a first of the three sides, the first feature having the second density;
a second feature proximate a second of the three sides, the second feature having the second density; and
a third feature proximate a third of the three sides, the third feature having the second density.

* * * * *